(12) United States Patent
Habimana

(10) Patent No.: US 10,316,150 B2
(45) Date of Patent: Jun. 11, 2019

(54) THERMOPLASTIC POLYMER COMPOSITIONS HAVING LOW FRICTION RESISTANCE

(71) Applicant: Dow Corning Corporation, Midland, MI (US)

(72) Inventor: Jean De La Croix Habimana, Maurage (BE)

(73) Assignee: Dow Silicones Corporation, Midland, MI (US)

( * ) Notice: Subject to any disclaimer, the term of this patent is extended or adjusted under 35 U.S.C. 154(b) by 7 days.

(21) Appl. No.: 15/300,485

(22) PCT Filed: Mar. 26, 2015

(86) PCT No.: PCT/EP2015/056562
§ 371 (c)(1),
(2) Date: Sep. 29, 2016

(87) PCT Pub. No.: WO2015/150218
PCT Pub. Date: Oct. 8, 2015

(65) Prior Publication Data
US 2017/0114188 A1    Apr. 27, 2017

(30) Foreign Application Priority Data
Mar. 31, 2014  (GB) .................................. 1405722.8

(51) Int. Cl.
| | | |
|---|---|---|
| *C08L 59/00* | (2006.01) | |
| *C08G 77/442* | (2006.01) | |
| *C08L 23/06* | (2006.01) | |
| *C08L 23/12* | (2006.01) | |
| *C08L 59/02* | (2006.01) | |
| *B29B 7/00* | (2006.01) | |
| *B29B 7/46* | (2006.01) | |
| *B29K 83/00* | (2006.01) | |

(52) U.S. Cl.
CPC ............ *C08G 77/442* (2013.01); *B29B 7/007* (2013.01); *B29B 7/46* (2013.01); *C08L 23/06* (2013.01); *C08L 23/12* (2013.01); *C08L 59/00* (2013.01); *C08L 59/02* (2013.01); *B29K 2083/00* (2013.01); *C08L 2205/06* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 4,874,807 A | 10/1989 | Endo et al. | |
| 5,173,532 A * | 12/1992 | Endo ................... | C08K 3/0033 524/425 |
| 6,602,953 B1 | 8/2003 | Horio et al. | |
| 8,097,670 B2 * | 1/2012 | Nagai ....................... | C08J 3/20 508/100 |
| 2002/0115790 A1 | 8/2002 | Doki et al. | |
| 2004/0072936 A1 | 4/2004 | Kim et al. | |
| 2008/0234413 A1 | 9/2008 | Shinohara et al. | |

FOREIGN PATENT DOCUMENTS

| | | |
|---|---|---|
| JP | H04146949 A | 5/1992 |
| JP | 2002-034611 A | 2/2002 |
| JP | 2009270025 A | 11/2009 |

OTHER PUBLICATIONS

Machine translation of JP 2009-270025, translation generated Apr. 2018, 7 pages. (Year: 2018).*
Human translation of JP-2009270025, translation generated Jul. 2018, 32 pages. (Year: 2018).*
English language abstract and machine translation for JP2009270025 (A) extracted from http://worldwide.espacenet.com database dated Sep. 21, 2016,18 pages.
English language abstract and machine translation for JPH04146949 (A) extracted from http://worldwide.espacenet.com database dated Sep. 21, 2016, 8 pages.
English language abstract and machine translation for JP2002034611 (A) extracted from http://https://www4.j-platpat.inpit.go.jp database dated Oct. 12, 2016, 11 pages.
PCT/EP2015/056562 International Search Report dated May 28, 2015, 4 pages.
Läuger, Jörg; Bernzen, Monika , "Getting the zero shear viscosity of polymer melts with different rheological tests", Annual Transactions of the Nordic Rheology Society, vol. 8, 2000, pp. 159-162.

* cited by examiner

*Primary Examiner* — Robert S Loewe
(74) *Attorney, Agent, or Firm* — Warner Norcross & Judd LLP

(57) ABSTRACT

A polymer composition comprises a thermoplastic polymer (A) and a copolymer (B). The thermoplastic polymer (A) is selected from a polyacetal and a polyolefin. The copolymer (B) is of a polysiloxane (B1) and an olefin polymer (B2). The copolymer (B) is a branched block copolymer and is free of any siloxane homopolymer. The copolymer (B) is useful as a friction reducing additive in the polymer composition.

16 Claims, No Drawings

THERMOPLASTIC POLYMER COMPOSITIONS HAVING LOW FRICTION RESISTANCE

CROSS-REFERENCE TO RELATED APPLICATIONS

This application is the National Stage of International Application No. PCT/EP2015/056562 filed on 26 Mar. 2015, which claims priority to and all advantages of Great Britain Patent Application No. 1405722.8 filed on 31 Mar. 2014, the content of which is hereby incorporated by reference.

This invention relates to thermoplastic polymer compositions containing a copolymer of a polysiloxane and an olefin polymer as a friction reducing additive in the thermoplastic polymer composition. The invention also relates to a process for the production of a thermoplastic polymer composition by melt kneading a polysiloxane with an olefin polymer and blending the thermoplastic polymer with the copolymer of polysiloxane and olefin polymer resulting from melt kneading. In one aspect of the invention the thermoplastic polymer is a polyacetal and the invention forms polyacetal compositions of low friction coefficient, but the invention also includes thermoplastic polymer compositions based on other thermoplastic polymers such as polyolefins.

Silanes and siloxanes are compounds containing silicon.

A silane is a compound derived from $SiH_4$. A silane often contains at least one Si—C bond. A silane usually contains only one Si atom.

A siloxane is a compound which contains at least one Si—O bond.

A polysiloxane contains several Si—O—Si— bonds forming a polymeric chain, where the repeating unit is —(Si—O)—. An organopolysiloxane is sometimes called a silicone. An organopolysiloxane contains repeating —(Si—O)— units where at least one Si atom bears at least one organic group. "Organic" means containing at least one carbon atom. An organic group is a chemical group comprising at least one carbon atom.

A polysiloxane comprises terminal groups and pendant groups. A terminal group is a chemical group located on a Si atom which is at an end of the polymer chain. A pendant group is a group located on a Si atom which Si atom is not at the end of the polymeric chain.

A polymer is a compound containing repeating units which units typically form at least one polymeric chain. A polymer can be a homopolymer or a copolymer. A homopolymer is a polymer which is formed from only one type of monomer. A copolymer is a polymer formed from at least two monomers. A polymer is called an organic polymer when the repeating units contain carbon atoms.

Some polymers are thermoset: once cooled and hardened, these polymers retain their shapes and cannot return to their original form. Other polymers are thermoplastics: they can soften upon heating and return to their original form.

A functional group is a chemical group having a function, for example a reactive group.

A capping or end-capping reaction is a reaction where a functional group is changed or removed. A capping reaction can be conducted at the end of a polymerization reaction, to neutralize at least partly the remaining functional, reactive groups that can be present on the surface of the polymer. For example some or all of remaining functional, reactive groups such as, for example silanol or alkenyl groups, present at the surface of a macromolecule can be removed in a capping reaction. Another functional group can be introduced by a capping reaction.

A macromolecule is a molecule of important size. A polymer is a macromolecule.

An olefin polymer, also called a polyolefin is a polymer produced from an olefin (usually an alkene) as monomer. Some examples of thermoplastic olefin polymers are: polyethylene (PE) and polypropylene (PP). The olefin polymer can be a homopolymer or a copolymer.

Polyacetals are thermoplastic polymers obtained from the polymerization of formaldehyde or cyclic oligomers of formaldehyde. We use the term 'polyacetal' to include polyoxymethylene (also known as POM) and copolymers comprising mainly oxymethylene units. Polyacetals are characterized by a high crystallinity resulting in high tensile strength, stiffness, low coefficient of friction, excellent dimensional stability and mechanical properties such as stiffness, hardness and creep resistance and a high thermo-oxidative stability. They are mainly used to produce parts requiring high fatigue resistance combined with high mechanical and chemical resistance, for example sliding components and gears for office appliances, plastic gears used in precision devices, household electrical appliances or automobiles, bearings, and conveyor belts. Polyoxymethylene shows limited vibration and noise damping in specialty parts requiring fast sliding properties such as office appliances gears, conveyor belts, bearings or medical tubing connectors.

U.S. Pat. No. 4,874,807 describes that adding a silicone oil having a specified viscosity to a polyoxymethylene composition improves frictional and abrasive resistance characteristics and reduce frictional noise when sliding. However the silicone oil, which is a low viscosity liquid and incompatible with the polyoxymethylene phase, tends to separate and to bleed out over time and the improvements may disappear over time.

U.S. Pat. No. 6,602,953 describes a polyoxymethylene resin composition, which comprises a polyoxymethylene resin, 0.05 to 10 parts by weight of a silicone grafted polyolefinic resin and a silicone polymer. The ratio of silicone-grafted polyolefinic to the silicone polymer in the composition is 99/1 to 70/30. According to this patent, the presence of silicone grafted polyolefin improves the compatibility of the silicone polymer present in the composition with the polyoxymethylene resin while maintaining the mechanical properties of the polyoxymethylene and without deteriorating the frictional and abrasive resistance.

JP2009270025 describes a polyolefin-polyorganosiloxane copolymer obtained by melt-kneading and reacting polyolefin-type compound (100) having reactive functional groups and silicone-type compound (50-300) having reactive functional groups. The reaction rate is said to be 70% or more. JPH04146949 describes ethylene-ethyl acrylate copolymer modified with organopolysiloxane obtained by thermally mixing organopolysiloxane with ethylene-ethyl acrylate copolymer in the presence of peroxide.

JP2002034611 describes resin composition comprising a polyoxymethylene resin and a polyolefin resin grafted with a silicone gum.

U.S. Pat. No. 6,602,953 describes polyoxymethylene resin compositions comprising a polyoxymethylene resin and a silicone compound-grafted polyolefinic resin.

We have found that the presence of free silicone polymer in such compositions even with a silicone grafted polyolefin is detrimental to the mechanical properties to some extent; the frictional and abrasive resistance will often be affected when the composition comes into contact with organic solvents. The free siloxane polymer will probably be washed away leaving unstructured surface.

A polymer composition according to the invention comprises a thermoplastic polymer (A) selected from a polyacetal and a polyolefin, and a copolymer (B) of a polysiloxane (B1) and an olefin polymer (B2), characterised in that the copolymer (B) is a branched block copolymer and is free of any siloxane homopolymer.

The copolymer (B) is believed to be branched i.e. comprises branched units in addition to linear polymeric chain.

Typically the copolymer (B) is present as an additive in the thermoplastic polymer (A). The copolymer (B) can for example be present in less than 10% by weight of the total composition, preferably less than 5, 4, 3, 2, 1% by weight.

A process according to the invention for the production of a thermoplastic polymer (A) composition of reduced coefficient of friction comprises the steps of:
(i) melt kneading a polysiloxane (B1) containing ethylenically unsaturated groups with an olefin polymer (B2) under process conditions at which all the polysiloxane (B1) is reacted with the olefin polymer to produce a branched block copolymer (B) which is free of any siloxane homopolymer; and
(ii) blending the thermoplastic polymer (A) with the branched block copolymer (B) produced in step (i).

We have found that the branched block copolymer (B) shows improved compatibility with polyolefins or polyacetals. The use of such a branched block copolymer (B) as a solid lubricant additive in polyacetal or polyolefin compositions provides improved slidability (low coefficient of friction and low wear rate) without deteriorating the mechanical properties of the thermoplastic polymer composition. We have found that blending the branched block copolymer (B) into a polyacetal composition yields a material having a lower and constant coefficient of friction and improved wear resistance compared to a similar composition in which some of the polysiloxane is present as siloxane homopolymer.

Preferably the branched block copolymer (B) is in pelletized or powdery form.

The ethylenically unsaturated groups in polysiloxane (B1) which are reacted with an olefin polymer to produce branched block copolymer (B) can for example be selected from vinyl, allyl, styryl, acrylic and methacrylic groups, or any other group containing a double bond or triple bond capable of reacting radically with a polyolefin chain during a melt kneading process.

The silicon-bonded groups in polysiloxane (B1) other than the ethylenically unsaturated groups are typically methyl groups but can be any other hydrocarbyl groups or any other groups which do not interfere with the silicone polyolefin radical reaction. Examples of other hydrocarbyl groups include phenyl groups and alkyl groups having 2 to 12 carbon atoms such as ethyl groups. Examples of other groups which do not interfere with the silicone polyolefin radical reaction include hydrogen, ether, ester, hydroxyl, and mercapto groups, and substituted alkyl groups such as hydroxyalkyl and mercaptoalkyl groups.

The level of ethylenically unsaturated groups in the polysiloxane (B1) is generally in the range from 0.05 to 2 mole % of all groups bonded to silicon, for example from 0.1% to 1%.

The ethylenically unsaturated groups can be present in end-capping groups on terminal silicon atoms of the polysiloxane (B1), and/or can be present in diorganosiloxane groups forming part of the polysiloxane chain (pendant groups). Preferably, the polysiloxane (B1) comprises both end-capping and pendant ethylenically unsaturated groups. For example vinyl groups can be present as terminal vinyldimethylsiloxy groups and/or as methylvinylsiloxy units in the polysiloxane chain. The polysiloxane (B1) may contain on average more than 2 ethylenically unsaturated groups per molecule. In one embodiment the polysiloxane (B1) contains at least 3 ethylenically unsaturated, for example vinyl groups per molecule. For example it can contain at least one terminal vinyldimethylsiloxy group and also methyl vinyl siloxy units randomly distributed in the polymer backbone. Such a polysiloxane can be represented by the formula

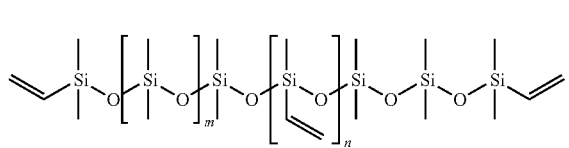

The polysiloxane (B1) can be 100% endcapped with units containing ethylenically unsaturated groups such as dimethylvinylsiloxy (—Si(CH$_3$)$_2$CH═CH$_2$) groups, but it can also contain terminal siloxane units having no ethylenically unsaturated groups. For example the polysiloxane (B1) can have mixed end functionality such as 70% dimethylvinylsiloxy terminal groups and 30% dimethylhydroxysiloxy (—Si(CH$_3$)$_2$OH) terminal groups.

The polysiloxane (B1) can for example be of degree of polymerization in the range from 100 to 7000, corresponding to a molecular weight of about 7500 to 500000 g/mole.

The olefin polymer (B2) which is reacted with the polysiloxane (B1) is an addition polymer in which at least 50 molar % of the repeating units are units of an olefinic hydrocarbon such as ethylene, propylene, 1-butene or styrene. The olefin polymer (B2) can be a homopolymer such as polyethylene, polypropylene or polystyrene, or can be a copolymer such as a copolymer of an olefin with an ethylenically unsaturated ester, for example a copolymer of ethylene with an acrylate or methacrylate ester or an ethylene vinyl acetate copolymer. The olefin polymer (B2) is conveniently an ethylene polymer or copolymer, and we have found that polyethylene and copolymers of ethylene with an acrylate or methacrylate ester are effective in reacting with the polysiloxane (B1) containing ethylenically unsaturated groups to produce branched block copolymers which improve the sliding properties and friction resistance of polyacetals. Examples of suitable copolymers include copolymers of at least 50% by weight ethylene with up to 50% of an acrylate or methacrylate ester such as methyl methacrylate, methyl acrylate or ethyl methacrylate, such as a copolymer of 95-60% by weight ethylene with 5-40% methyl methacrylate, alternatively a copolymer of 90-70% by weight ethylene with 10-30% methyl methacrylate.

The olefin polymer (B2) is preferably substantially free of reactive, functional groups.

The branched block copolymer (B) is produced by melt kneading the polysiloxane (B1) containing ethylenically unsaturated groups with the olefin polymer (B2), that is by mixing the polysiloxane (B1) and the olefin polymer (B2) under conditions where they are both in liquid form. Preferably, such conditions include heating. The polysiloxane (B1) and the olefin polymer (B2) are mixed under process conditions at which all the polysiloxane (B1) is reacted with the olefin polymer to produce a branched block copolymer (B) which is free of any siloxane homopolymer.

The polysiloxane (B1) and the olefin polymer (B2) are reactively mixed at a ratio usually in the range 10 to 90 parts by weight of the polysiloxane (B1) to 90 to 10 parts by weight of the olefin polymer (B2), for example 20 to 80 parts by weight of the polysiloxane (B1) to 80 to 20 parts by weight of the olefin polymer (B2).

The polysiloxane (B1) and the olefin polymer (B2) can be mixed effectively in a continuous mixer such as an extruder, which can be a uniaxial extruder, a biaxial extruder, or a multiaxial extruder. A twin screw extruder, particularly one having a length/diameter (L/D) ratio over 40, is generally suitable. The olefin polymer (B2) can for example be introduced into the main feed of a co-rotative twin screw extruder operating at a temperature high enough to melt the olefin polymer. The polysiloxane (B1) can be added into the already melted olefin polymer phase using for example a gear pump. To maintain the quality of working surroundings and avoid side reactions, inert gas flushing or deaeration using a single stage venting or multi-stage venting can be used.

Alternative plastic mixing equipment can be used, for example a batch internal mixer such as a Z-blades mixer or a Banbury mixer.

The temperature of mixing the polysiloxane (B1) and the olefin polymer (B2) is generally in the range 150° C. to 240° C. The residence time of the liquid phase reagents in an extruder can for example be 30 to 240 seconds, optionally 50 to 150 seconds. Within these ranges, the temperature and mixing time required to produce a branched block copolymer (B) which is free of any siloxane homopolymer can be determined; this will depend on the vinyl content of the polysiloxane, the shear rate of the mixing apparatus used and the feed rate through the mixing apparatus. The process conditions (temperature, and screw speed and feed rate when mixing in an extruder) should be adjusted to produce a branched block copolymer product having a zero shear viscosity from 50.000 Pas to 800000 Pas, more preferably from 100000 Pas to 500000 Pas at 190° C., measured according to the creep test method described by Jorg Lauger and Monika Bernzen in "Annual Transactions of Nordic Society of Rheology volume 8, 2000, page 161".

The branched block copolymer product (B) may be soluble or partially soluble in xylene at reflux temperature. If the branched block copolymer product is completely insoluble in xylene at reflux temperature, it is considered to be free of any siloxane homopolymer. It has been observed that nevertheless its performances for lowering the friction coefficient are not affected. The formation of a branched block copolymer (B) which is free of any siloxane homopolymer can be tested by extracting the product with xylene under reflux, and analysing the fraction which remains soluble after cooling the xylene solution at room temperature. In a preferred test procedure, the amount of xylene extract is mixed with an equal volume of toluene and allowed to cool to ambient temperature (about 25° C.). Any unreacted olefin polymer (B2) and some polysiloxane polyolefin copolymer which is rich in polyolefin precipitate out of the xylene/toluene mixture leaving soluble polysiloxane polyolefin copolymer species, and any unreacted polysiloxane (B1), in solution.

The fraction of the branched block copolymer product (B) which is extracted by xylene under reflux and remains soluble in toluene/xylene after cooling is then analysed to determine (i) the molecular weight, (ii) the solubility in toluene/xylene as indicated by the Mark-Houwink-Sakurada parameters and (iii) the molecular structure by $^1$H NMR analysis.

Molecular weight analysis is carried out by gel permeation chromatography (GPC) calibrated by narrow and broad polystyrene standards. Molecular weight data obtained is compared to the polysiloxane (B1) from which the branched block copolymer product (B) was prepared. The polydispersity of a branched block copolymer product free of siloxane homopolymer is substantially greater than the polydispersity of the polysiloxane (B1), but shows a monomodal distribution.

The Mark-Houwink parameters (a, K) also can be obtained from gel permeation chromatography measurements. The Kuhn-Mark-Houwink-Sakurada equation gives a relation between intrinsic viscosity q and molecular weight M:

$\eta = KM^a$, where K and a are constants. In gel permeation chromatography, the intrinsic viscosity of a polymer is directly related to the elution volume of the polymer. Therefore, by running several monodisperse samples of polymer in a gel permeation chromatograph (GPC), the values of K and a can be determined graphically using a line of best fit. Mark-Houwink parameters a and K lower than that of the polysiloxane indicate a lower solubility of the xylene extracted branched block copolymer product (B) than the polysiloxane due to olefin polymer units copolymerised with the polysiloxane.

In $^1$H NMR analysis, the presence of olefin polymer units in addition to polysiloxane units in the xylene soluble extract of the branched block copolymer product (B) which has been diluted with toluene, cooled and filtered indicates that the polysiloxane (B1) has been copolymerised with olefin polymer (B2) since free olefin polymer such as poly(ethylene methylmethacrylate) is neither soluble in xylene nor in xylene/toluene mixture For example, when the olefin polymer (B2) is an ethylene methyl methacrylate copolymer, a signal of methacrylate groups can be measured by $^1$H NMR analysis in the soluble fraction.

The thermoplastic polymer (A) can for example be a polyacetal or a polyolefin. The process of the invention is particularly suitable for producing a polyacetal composition of reduced coefficient of friction. The polyacetal can for example be a polyoxymethylene homopolymer such as that sold by DuPont under the trade mark 'Delrin' or a polyoxymethylene copolymer such as that sold by Ticona under the trade mark 'Hostaform C 9021'. Polyoxymethylene homopolymers are obtained from the polymerization of formaldehyde or cyclic oligomers of formaldehyde and quenched with ether or ester groups at both terminal ends of the polymer chain. Polyoxymethylene copolymers are obtained from the polymerization of cyclic oligomers of formaldehyde such as trioxane with a comonomer such as dioxolane or ethylene oxide. The polyacetal can be a block copolymers of hydrogenated polybutadiene and an oxymethylene copolymer.

The melt flow index (MFI) of polyoxymethylene resin for use in the present invention as thermoplastic polymer (A) is preferably in the range 1.0-100 g/10 min., for example 2.0-80 g/10 min. (as measured on the basis of ASTM-D1238-57T).

A polyacetal composition according to the present invention can for example comprise 90 to 99.5% by weight of a polyacetal and 0.5 to 10% of the branched block copolymer (B) of polysiloxane (B1) and olefin polymer (B2).

The polyacetal composition can contain stabilisers, as are commonly used in polyacetal compositions, for example, a heat stabilizer and/or a weather (light) resistant stabilizer.

Use of an antioxidant or a formaldehyde- or formic acid-trapping agent or simultaneous use thereof is effective as a heat stabilizer.

The antioxidant can be a hindered phenol-based antioxidant, for example, n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), triethyleneglycol-bis-(3-(3-t-butyl-5-methyl-4-hydroxyphenyl)-propionate), tetrakis-(methylene-3-(3',5'-di-t-butyl-4'-hydroxyphenyl)-propionatemethane, 3,9-bis(2-(3-(3-t-butyl-4-hydroxy-5-methylphenyl)propionyloxy)-1,1-dimethylethyl)-2,4,8,10-tetraoxaspiro(5,5)undecane, N,N'-bis-3-(3',5'-di-t-butyl-4-hydroxyphenol)propionylhexamethylenediamine, N,N'-tetramethylenebis-3-(3'-methyl-5'-t-butyl-4-hydroxyphenol)propionyldi amine, N,N'-bis-(3-(3,5-di-t-butyl-4-hydroxyphenol)propionyl)hydrazine, N-salicyloyl-N'-salicylidenehydrazine, 3-(N-salicyloyl) amino-1,2,4-triazole, or N,N'-bis(2-(3-(3,5-di-butyl-4-hydroxyphenyl)propionyloxy)ethyl)oxyamide.

Formaldehyde or formic acid-trapping agents include, for example, (a) formaldehyde reactive nitrogen-containing compounds, (b) formaldehyde reactive nitrogen-containing polymers, and (c) hydroxides, inorganic acid salts, carboxylates, or alkoxides of alkali metals or alkaline earth metals.

The thermoplastic polymer (A) can alternatively be a polyolefin, for example polyethylene or polypropylene. The melt flow index of the polyolefin (A) can for example be in the range 1.0-100 g/10 min. A polyolefin composition according to the present invention can for example comprise 90 to 99.5% by weight polyolefin and 0.5 to 10% of the branched block copolymer (B).

The thermoplastic polymer (A) and the branched block copolymer (B) can in general be mixed using any mixing method known for thermoplastic materials. They are preferably melt mixed at a temperature at which the thermoplastic polymer (A) and the branched block copolymer (B) are both in liquid form. The thermoplastic polymer (A) and the branched block copolymer (B) can be mixed in any of the apparatus described above for melt kneading the polysiloxane (B1) with the olefin polymer (B2), for example an extruder or for example a batch internal mixer such as a Z-blades mixer or a Banbury mixer. The thermoplastic polymer (A) and the branched block copolymer (B) can alternatively simply be mixed on an injection press.

The branched block copolymer (B) can thus be used as a solid lubricant additive in polyolefins or polyoxymethylene resin compositions providing improved slidability (low coefficient of friction and low wear rate) without deteriorating the mechanical properties of the matrix composition. The compositions comprising the thermoplastic polymer (A) and the branched block copolymer (B) can be shaped using any of the moulding processes used for thermoplastic materials, for example injection moulding, extrusion or blow moulding.

Compositions comprising polyacetal as thermoplastic polymer (A) with the branched block copolymer (B) can for example be used to produce sliding components and gears for office appliances, plastic gears used in precision devices, household electrical appliances and automobiles, or to produce bearings or conveyor belts or medical tubing connectors.

Compositions comprising a polyolefin such as polyethylene or polypropylene as thermoplastic polymer (A) with the branched block copolymer (B) can for example be used to produce extruded film having improved slip properties. The branched block copolymer (B) has improved compatibility with the polyolefin compared to a pure silicone additive.

The invention also provides the use of a solid copolymer (B) as additive in a thermoplastic polymer (A) selected from a polyacetal and a polyolefin, wherein the copolymer (B) is a branched block copolymer of a polysiloxane (B1) and an olefin polymer (B2), and is free of any siloxane homopolymer. Preferably, the solid copolymer (B) improves the slidability and/or reduces the coefficient of friction and/or improves the wear resistance of the thermoplastic polymer (A).

The invention is illustrated by the following Examples, in which parts and percentages are by weight.

Weight percentages are based on the weight of the total composition unless indicated differently.

The Examples will be described with reference to Figure 1 of the accompanying drawings, which comprises refractive index chromatograms of the branched block copolymer products of Examples 1 and 9.

EXAMPLES 1 TO 11

60 parts silicone gum (B1a) was melt blended with 40 parts olefin polymer (B2a) in a 'Prism TSE 24 TC' twin screw extruder. The silicone gum (B1a) from Dow Corning is a vinyl dimethylsiloxy capped dimethylsiloxy, methylvinylsiloxy copolymer of an average molecular weight of 330000 gr/mole and a total vinyl content of 0.03 mole % of vinyl units ($-CH=CH_2$) and a Williams plasticity of 60 mils (as measured by ASTM D926-98). The olefin polymer (B2a) is an ethylene methyl methacrylate copolymer (EMMA) from Sumitomo (Acryft WD 301-F) containing 9.8% of methyl methacrylate units and has a melt flow index of 6.5.

The silicone gum (B1a) and olefin polymer (B2a) were melt blended at different temperatures, screw speeds and feed rates as shown in Table 1 below. The temperature was varied from 160° C. to 220° C., the screw rotational speed was varied from 150 to 350 rpm and the feed rate varied from 3 to 4 Kg/hour. The extruded strands were pelletized and dried at 65° C. overnight. 4 samples were collected from each Example for analysis. The zero shear viscosity $\eta_0$ was determined by dynamic mechanical analysis (DMA) and value the creep test method described in Annual Transactions of Nordic Society of Rheology volume 8, 2000, page 161. The complex viscosity and the storage modulus G' were measured at 190° C. and 0.0251 Hz. The results are shown in Table 1.

TABLE 1

| Example | Temp ° C. | Screw Speed (RPM) | Output (Kg/h) | $\eta^*$ – 190° C. (0.0251 Hz) | G' – 190° C. (0.0251 Hz) | $\eta_0$ – 190° C. |
|---|---|---|---|---|---|---|
| 1 | 160 | 150 | 3 | 10960 | 1125 | 53 230 |
| 2 | 160 | 350 | 3 | 19020 | 2310 | 123 000 |
| 3 | 190 | 250 | 3.5 | 21285 | 2672 | 106 400 |
| 4 | 160 | 150 | 4 | 19048 | 2318 | 131 000 |
| 5 | 160 | 350 | 4 | 19884 | 2433 | 223 000 |
| 6 | 190 | 250 | 3.5 | 23209 | 2958 | — |
| 7 | 220 | 150 | 3 | 48708 | 6964 | 681 000 |
| 8 | 220 | 350 | 3 | 64070 | 9253 | 850 000 |
| 9 | 220 | 150 | 4 | 46585 | 6537 | 582 700 |
| 10 | 220 | 350 | 4 | 60657 | 8679 | — |
| 11 | 190 | 250 | 3.5 | 25084 | 3264 | — |

Table 1 shows that the complex viscosity η*, storage modulus G' and the zero shear viscosity $\eta_0$ of the branched block copolymers (B) produced change as a result of changing the process conditions between the Examples.

Samples of the branched block copolymers produced in Examples 1 and 9 were extracted with xylene for further analysis. About 0.15 g of each branched block copolymer was accurately weighted and placed into a glass flask. 10 mL of p-xylene was added using a micro dosing pipette. The sample was left to solubilise under xylene reflux (oil bath temperature 180° C.) during 10 hours of continuous magnetic stirrer agitation. Then 5 mL of the solutions were mixed with 5 mL of toluene into 10 mL glass bottles. Each solution was cooled whilst gently shaking for 24 hours and then filtered through 0.2 µm PTFE filters into 1.5 mL glass auto sampler vials. All samples showed resistance while passing though the filter, due to the olefin polymer and olefin-rich branched block copolymer that has re-precipitated at room temperature. Polymer extracted with xylene and remaining dissolved after being diluted with toluene, cooled and filtered is deemed 'Silicone material' and comprises polysiloxane and/or siloxane-rich branched block copolymer. The proportion of branched block copolymer product remaining dissolved after being diluted with toluene, cooled and filtered is shown in Table 2 below.

Molecular weight information on the samples of Examples 1 and 9 is obtained by gel permeation chromatography (GPC) analysis of the polymer fraction which remains soluble in xylene/toluene after cooling and filtration. The analyses were carried out with a 'Viscotek GPC Max' using a triple detection capability Viscotek TDA305 unit composed of a differential refractometer, an online differential pressure viscometer and low angle light scattering (LALS: 7° and 90° angles of detection). Mobile phase: Toluene HPLC grade, Columns: 2×PL Gel Mixed C from Varian—(7.5*300 mm, 5 µm particle size)+PL Gel Guard column, Flow: 1 mL/min; Injection volume: 100 µL; Run time: 37 min; Column temperature: 40° C., Detector temperature: 40° C.; Software: Omnisec 4.6.1 (Viscotek), The detectors were calibrated by injection of a narrow Mw range polystyrene standard (Mw 68,100 g/mol) of known concentration. Correct run parameters are checked by using a narrow and broad Mw range polystyrene standards (respectively PS71K and PS235K). Molecular weights data were also measured for the starting silicone polymer (B1a). The results are shown in Table 2, which lists number average molecular weight Mn, weight average molecular weight Mw, polydispersity MWD=Mw/Mn, and Marl-Houwink constants M-H a and M-H logK.

TABLE 2

| Example | Mn | MW | MWD | M-H a | M-H Log K | % of the Silicone in the Xylene Soluble Fraction % |
| --- | --- | --- | --- | --- | --- | --- |
| 9 | 191,000 | 433,800 | 2.27 | 0.68 | −3.8 | 19.3 19.3 |
| 1 | 257,600 | 541,700 | 2.10 | 0.69 | −3.9 | 227.8 27.8 |
| Pure Silicone | 377,900 | 645,700 | 1.71 | 0.73 | −4.0 | 100 |

As can be seen from Table 2, the polydispersity MWD of the products of Examples 1 and 9 is much larger than that of the polysiloxane B1a used as the starting material and the molecular weights (Mn, MW) are lower that of polysiloxane B1a. The Mark-Houwink parameters a, log K of the products of Examples 1 and 9 are lower than that of polysiloxane B1a, indicating a lower solubility of these branched block copolymer products in xylene/toluene compared to the pure silicone polymer B1a. The low solubility of this fraction of the products of Examples 1 and 9 is believed to be due to the presence of ethylene methyl methacrylate copolymer units in the extracted branched block copolymer.

The refractive index chromatograms of the branched block copolymer products of Examples 1 and 9 and of polysiloxane B1a are shown overlaid in Figure 1. As can be seen from Figure 1 the refractive index chromatograms show a monomodal distribution excluding the possibility of having two populations.

The soluble fractions from samples of Examples 1 and 9, obtained after xylene extraction, dilution with toluene, cooling and filtering were analysed by $^1$H NMR. The samples were heated for 15 minutes at 40° C. and then diluted in CDCl$_3$ and analysed using NMR BRUKER AVANCE I (400 MHz), 5 mm probe. The $^1$H NMR spectrum shows presence of strong signal at 3.654 ppm attributed to the methyl group of the methyl methacrylate units. The ratio of this signal to the signal of methyl groups of the silicone gives the relative concentration of ethylene methyl methacrylate copolymer (EMMA) in the samples analysed. Table 3 shows the chemical shifts, integration and calculation of relative concentration of EMMA in the analysed xylene soluble fractions. The soluble fraction contains respectively 4.73% and 9.72% of EMMA for samples of Examples 1 and 9. The presence of EMMA polymer units in the xylene soluble fraction indicates a presence of silicone/EMMA copolymer since EMMA polymer on its own is not soluble in xylene at room temperature. It also explains the lower solubility in toluene as compared to pure silicone. Therefore, the samples from Examples 1 and 9 which remain dissolved after being xylene extracted, diluted with toluene, cooled and filtered comprise a silicone-EMMA copolymer that contains a small fraction of ethylene methyl methacrylate copolymer branches. It is believed the extracted fraction is not a silicone homopolymer since the Mark-Houwink parameters are lower than that of pure silicone.

TABLE 3

| | Chemical. Shift (ppm) | Example 1 Relative Integral | Example 9 Relative Integral |
| --- | --- | --- | --- |
| Si(CH$_3$)$_2$ | 0.078 | 566.252 | 597.093 |
| CH2—CH—CO(OCH$_3$) | 3.654 | 1.186 | 2.71 |
| EMMA % | | 4.73 | 9.72 |

Delrin® 150 NC010 high viscosity polyoxymethylene (POM) homopolymer commercially available from Dupont was mixed with the pelletised branched block copolymers produced in each of Examples 1 and 9 in a 'Prism TSE 24 TC' twin screw extruder, at the concentration specified in Table 4. The samples were injected pressed at 230° C. using DEMAG press injector to make test pieces suitable for friction coefficient determination. Two reference POM compositions were also tested: (1) pure POM and (2) POM containing polysiloxane B1a silicone gum at the same level of silicone active.

Friction measurements were carried out using a low load tribometer with POM ball against the sample, with a normal load of 12.5N corresponding to 70 MPa of contact load, speed of 8 mm/s over 10 mm of sliding distance at 25° C. Friction coefficients were collected after 50, 100, 200, 400 and 700 cycles. Table 4 gives the performances of each specimen.

TABLE 4

| Level in POM composition | | 50 cycles | | 100 cycles | | 200 cycles | | 400 cycles | | 700 cycles | |
|---|---|---|---|---|---|---|---|---|---|---|---|
| | | Trial 1 | Trial 2 | Trial 1 | Trial 2 | Trial 1 | Trial 2 | Trial 1 | Trial 2 | Trial 1 | Trial 2 |
| Pure POM | 0 | 0.249 | 0.352 | 0.445 | 0.458 | 0.457 | 0.476 | 0.458 | 0.485 | 0.479 | 0.46 |
| Silicone B1a | 2 | 0.047 | 0.034 | 0.046 | 0.034 | 0.043 | 0.035 | 0.042 | 0.038 | 0.042 | 0.045 |
| Example 9 | 3.3% | 0.028 | 0.034 | 0.028 | 0.034 | 0.028 | 0.033 | 0.029 | 0.035 | 0.03 | 0.036 |
| Example 1 | 3.3% | 0.037 | 0.029 | 0.035 | 0.028 | 0.033 | 0.028 | 0.037 | 0.029 | 0.044 | 0.031 |

It can be seen from Table 4 that in general the silicone gum or the silicone polyolefin branched block copolymer (B) at a level of 2% silicone decreases the friction coefficient of the POM by a factor of 10. The silicone-EMMA copolymer products of Examples 1 and 9 show 15% lower friction resistance that the silicone gum based POM composition.

What is claimed is:

1. A polymer composition comprising:
   a thermoplastic polymer (A) selected from a polyacetal and a polyolefin; and
   a copolymer (B) of a polysiloxane (B1) and an olefin polymer (B2);
   wherein the copolymer (B) is a branched block copolymer having a zero shear viscosity of 50,000 to 8,000,000 Pa·s at 190° C.;
   and wherein the polymer composition is free of any siloxane homopolymer.

2. The polymer composition according to claim 1, wherein the olefin polymer (B2) is a copolymer of at least 50% by weight ethylene with up to 50% of an acrylate or methacrylate ester.

3. The polymer composition according to claim 2, wherein the thermoplastic polymer (A) is polyoxymethylene.

4. The polymer composition according to claim 2, wherein the olefin polymer (B2) is a copolymer of 95-60% by weight ethylene with 5-40% methyl methacrylate.

5. The polymer composition according to claim 1, wherein the olefin polymer (B2) is polyethylene.

6. The polymer composition according to claim 1, wherein the branched block copolymer (B) is a copolymer of 20-80% by weight polysiloxane (B1) and 80-20% olefin polymer (B2).

7. A process for the production of a thermoplastic polymer composition of reduced coefficient of friction, said process comprising the steps of:
   (i) melt kneading a polysiloxane (B1) containing ethylenically unsaturated groups with an olefin polymer (B2) under process conditions at which all the polysiloxane (B1) is reacted with the olefin polymer (B2) to produce a branched block copolymer (B) which is free of any siloxane homopolymer; and
   (ii) blending a thermoplastic polymer (A) with the branched block copolymer (B) produced in step (i) to produce the thermoplastic polymer composition.

8. The process according to claim 7, wherein the polysiloxane (B1) and the olefin polymer (B2) are melt kneaded in an extruder at a temperature in the range of 150° C. to 240° C.

9. The process according to claim 8, wherein the extruder is a biaxial or multiaxial extruder.

10. The process according to claim 7, wherein the polysiloxane (B1) contains at least 3 vinyl groups per molecule.

11. The process according to claim 7, wherein the thermoplastic polymer (A) and the branched block copolymer (B) are blended in an extruder.

12. The process according claim 7, wherein the thermoplastic polymer (A) and the branched block copolymer (B) are blended by mixing in an injection press.

13. The process according to claim 7, wherein the thermoplastic polymer (A) is polyoxymethylene or an oxymethylene copolymer.

14. The process according to claim 7, wherein the thermoplastic polymer (A) is a polyolefin.

15. A process of improving a thermoplastic polymer (A), said process comprising the step of:
   adding a solid copolymer (B) to the thermoplastic polymer (A);
   wherein the thermoplastic polymer (A) is selected from a polyacetal and a polyolefin; and
   wherein the copolymer (B) is a branched block copolymer of a polysiloxane (B1) and an olefin polymer (B2), and wherein the copolymer (B) has a zero shear viscosity of 50,000 to 8,000,000 Pa·s at 190° C.; and
   wherein the process is free of any siloxane homopolymer.

16. The process according to claim 15, wherein addition of the solid copolymer (B) improves the slidability and/or reduces the coefficient of friction and/or improves the wear resistance of the thermoplastic polymer (A).

* * * * *